United States Patent [19]

Nielsen

[11] Patent Number: 4,920,486

[45] Date of Patent: Apr. 24, 1990

[54] DISTRIBUTED ARBITRATION APPARATUS AND METHOD FOR SHARED BUS

[75] Inventor: Michael J. K. Nielsen, Palo Alto, Calif.

[73] Assignee: Digital Equipment Corporation, Maynard, Mass.

[21] Appl. No.: 123,382

[22] Filed: Nov. 23, 1987

[51] Int. Cl.⁵ .............................................. G06F 15/16
[52] U.S. Cl. .................................. 364/200; 364/242.6; 364/242.8; 364/242.92; 364/935.41; 364/937.01
[58] Field of Search ................ 364/200 MS File, 200, 364/900 MS File

[56] References Cited

U.S. PATENT DOCUMENTS

| | | | |
|---|---|---|---|
| 4,063,220 | 12/1977 | Metcalfe et al. | 340/147 |
| 4,320,457 | 3/1982 | Tanikawa | 364/200 |
| 4,499,538 | 2/1985 | Finger et al. | 364/200 |
| 4,536,839 | 8/1985 | Shah et al. | 364/200 |
| 4,633,394 | 12/1986 | Georgion et al. | 364/200 |
| 4,656,627 | 4/1987 | Hasley et al. | 370/60 |
| 4,719,622 | 1/1988 | Whipple et al. | 364/200 |
| 4,760,515 | 7/1988 | Malmquist et al. | 364/200 |

*Primary Examiner*—Gareth D. Shaw
*Assistant Examiner*—Gopal C. Ray
*Attorney, Agent, or Firm*—Flehr, Hohbach, Test, Albritton & Herbert

[57] ABSTRACT

Each user of an intercommunicastion bus is associated with a distinct channel of an arbitration bus and maintains a priority record indicating its current priority status against each other user. During a contention interval each user then seeking to use the intercommunication bus bids for use of it by transmitting a bus request signal and makes an analysis of the signals to ascertain if it has a dominating priority for initiating a transaction on the bus, and access is granted accordingly. During the use-signal interval a user then using the intercommunication bus transmits an in-use signal used to update priority records with the effect of giving the last using user lowest priority. For transactions which require a response from a user other than the one initiating the transaction, a second round of bidding is conducted to determine whether any user is qualified to respond and if so which will be enabled to do so. When the response bidding shows no bidders the system immediately initiates bidding for a new transaction.

11 Claims, 8 Drawing Sheets

BUS CHANNEL

|   | $A_1$ | $A_2$ | $A_3$ | ... | $A_n$ |
|---|---|---|---|---|---|
| $K_1$ | T | $M_1$ | $M_2$ | | $M_{n-1}$ |
| $K_2$ | $M_1$ | T | $M_2$ | | $M_{n-1}$ |
| $K_3$ | $M_1$ | $M_2$ | T | | $M_{n-1}$ |
| ... | | | | | |
| $K_n$ | $M_1$ | $M_2$ | $M_3$ | | T |

KEY

DISTRIBUTED ARBITRATION APPARATUS AND METHOD FOR SHARED BUS

BRIEF SUMMARY OF THE INVENTION

Computer systems may be organized with a plurality of processors operating concurrently in parallel. In such systems, the several processors operate quasi independently, but from time to time need to transfer information between processors or between a processor and other system components such as input-output devices. In order to effect these information transfers, an intercommunication bus is provided connecting to the processors and to other system component, the bus being capable of transferring information from any user to any other. Such a bus is very flexible in its operation, but it is necessary to have some procedure to assure orderly use of the intercommunication bus. This invention relates to controlling access to an intercommunication bus shared by several users so as to provide orderly use of the bus by a plurality of users.

The invention features a multi-channel arbitration bus with each user associated with a distinct channel thereof and a priority record for each user indicating current priority status of the associated user against each other user. A contention interval and a use-signal interval are defined by a state machine associated with each user. During the contention interval each user then seeking to use the intercommunication bus bids for use of it by transmitting a bus request signal. Each user makes an analysis of the bus request signals to ascertain if it has a dominating priority for use of the intercommunication bus for a transaction and access is granted accordingly. During the use-signal interval a user then using the intercommunication bus transmits an in-use signal. The in-use signal is used by each user to up-date its priority record with the effect of giving the last using user a priority subordinate to all others for the next bidding to initiate a transaction.

For transactions which require a response from some system user other than the one initiating the transaction, a second round of bidding is conducted to determine whether any user is qualified to respond and if so which will be enabled to do so. When the response bidding shows no bidders the system immediately initiates bidding for a new transaction; when there are one or more qualified responders, one is selected and enabled to respond.

BRIEF DESCRIPTION OF THE DRAWING

FIG. 8 shows the connection scheme of the interconnect keys of the access control system of FIG. 1.

DETAILED DESCRIPTION

With reference to the Figures, access control system 10 according to the invention controls use of intercommunication bus 14 by processor users 12, 13, and i/o device 16. Information is transferred on the intercommunication bus in predefined related sequential or parallel operations denominated a transaction. There may be several types of transaction with distinct operations such as reading or writing to the cache memory of another processor, acknowledgement of interrupts, and reading or writing to input-output devices. Certain transactions, notably interrupt acknowledge and memory read, are initiated by one user and require a response from another user.

Figure 1:
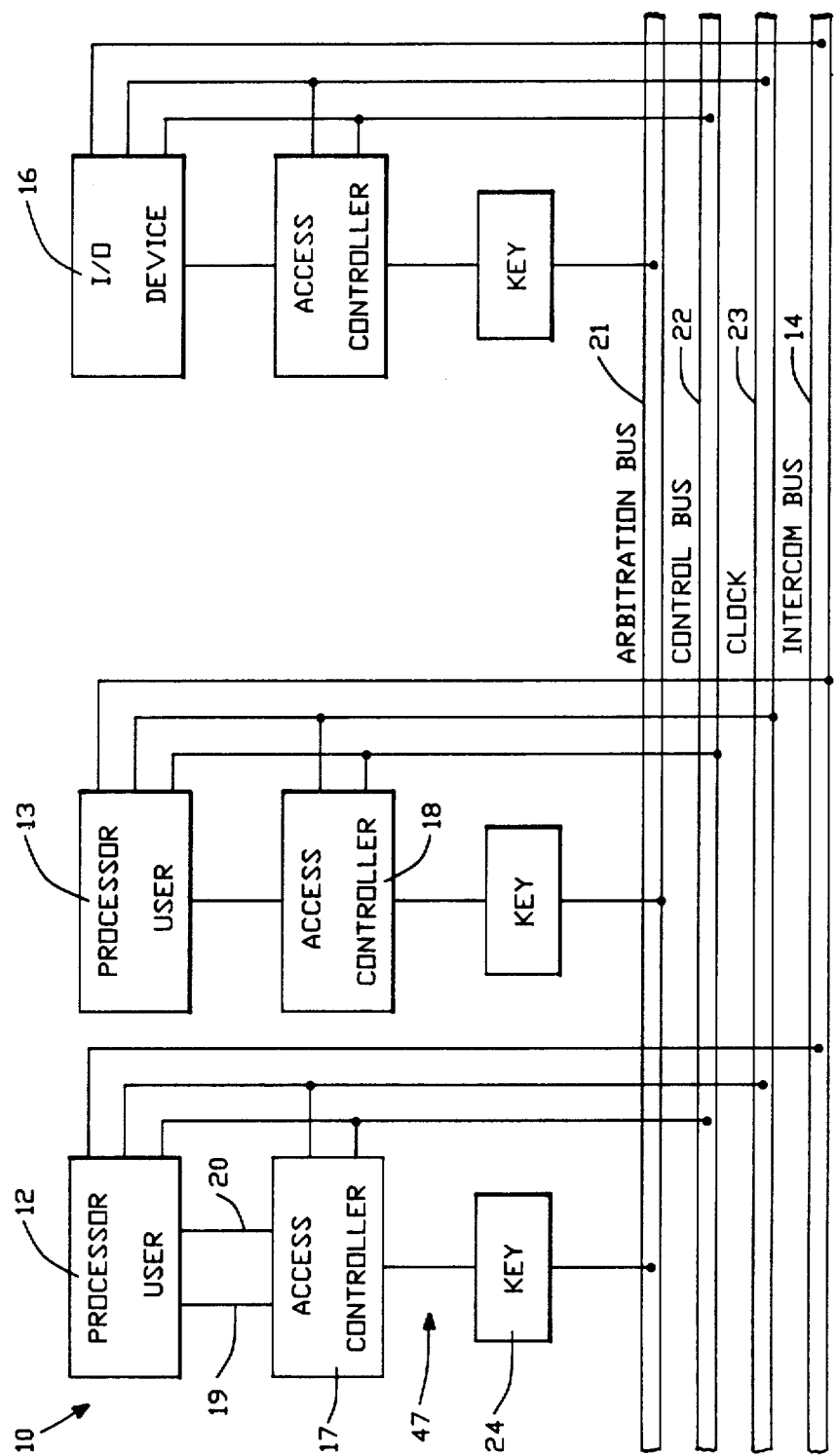
FIG. 1 shows schematically an access control system controlling responding by a plurality of bus users of an intercommunication bus according to the invention.

Access control system 10 as shown particularly in FIG. 1, includes arbitration bus 21, having n channels, control bus 22, and bus system clock 23. Bus system clock generates and propagates to all bus users timing signals which define definite time increments which synchronize the whole bus system. The clock propagates to all bus stations a primary periodic signal (the A clock) the rising edge thereof defining the start of a new time increment. The clock also propagates a secondary signal (the B clock) phase shifted from the A clock, the rising edge of which defines a time towards the end of the each time increment. The B clock is generally used to admit signals into latches after propagation transients have subsided. The clock signals are diagramed in FIG. 5.

Representative user 12 is connected to associated access controller 17 by bus request line 19, by response ready line 50, by grant line 20 and by response enable line 51, and to intercommunication bus 14, control bus 22, and bus system clock 23. Access controller 17 is connected directly to control bus 22 and bus system clock 23, and through interconnect key 24 to arbitration bus 21. User 12, together with its access controller 17 is connected to interconnect key 24, initialize key 38 and intercommunication bus 14 through standard port 47. User 13 and further users including i/o device 16, are connected as is user 12.

Figure 2:
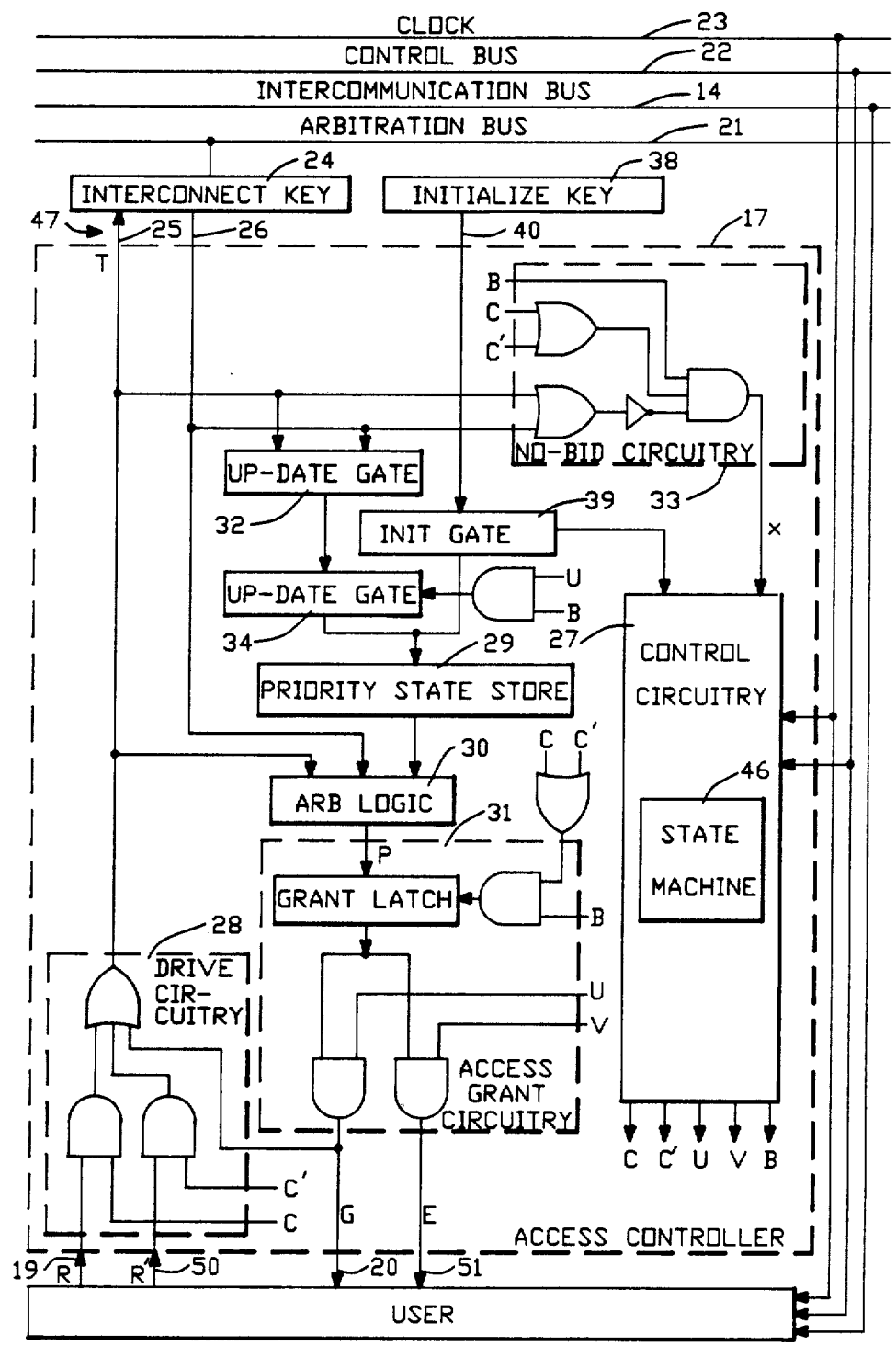
FIG. 2 shows in block diagram form an access controller used in the response control system of FIG. 1.

Access controller 17 includes transmit line 25, (n-1) monitoring lines 26, control circuitry 27, drive circuitry 28, priority state store 29, arbitration logic 30, access grant circuitry 31 with grant latch 37, up-date circuitry 32, no-bid circuitry 33, initialize gate 39 and up-date gate 34, interconnected as shown in FIG. 2.

Figure 3:
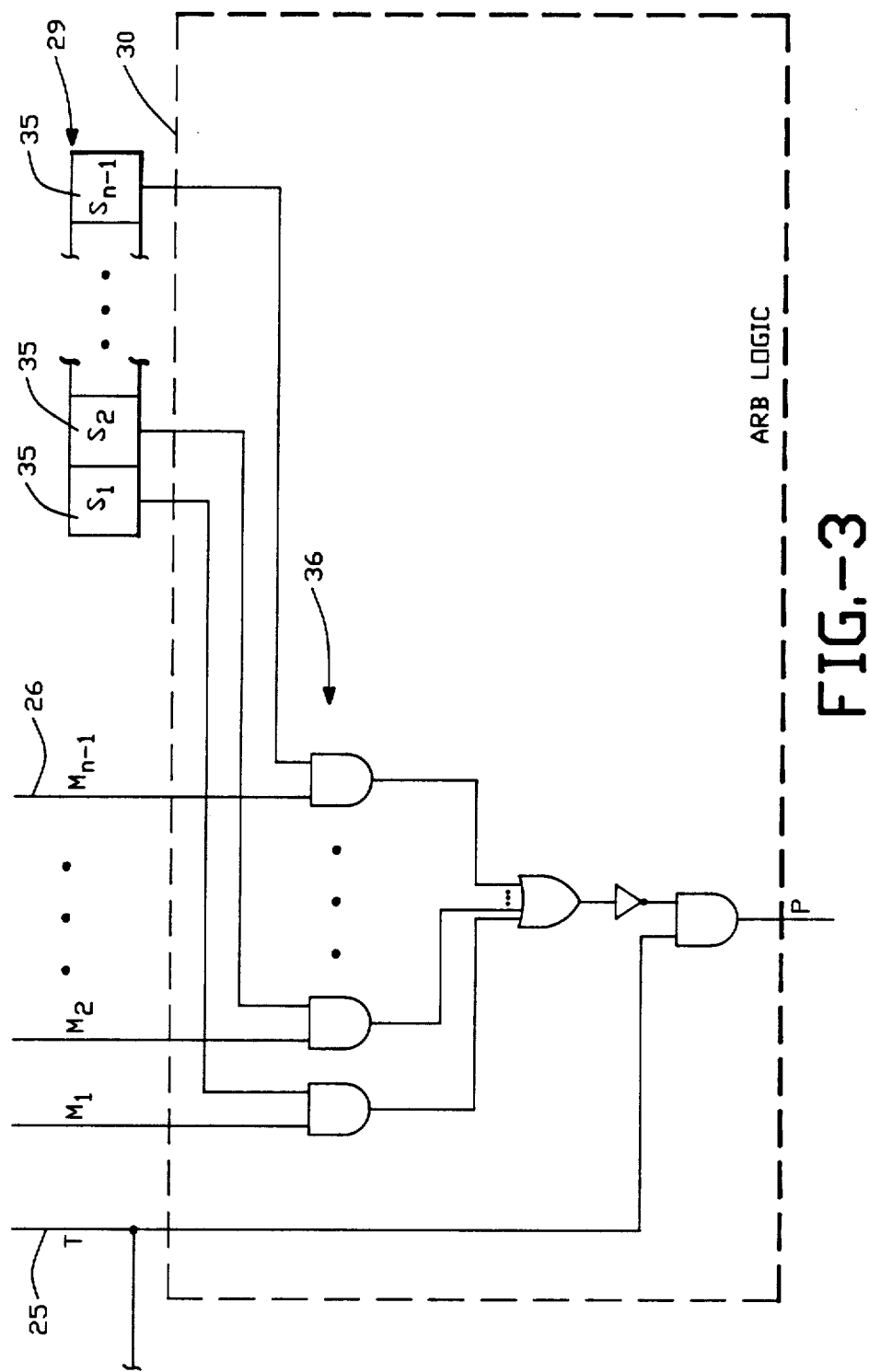
FIG. 3 shows details of the priority state store and the arbitration logic used in the access controller of FIG. 2.

Further details of priority state store 29 and arbitration logic 30 are shown in FIG. 3. Priority state store 29 includes (n-1) two-state storage elements 35, advantageously flip-flops. From storage elements 35 outputs pass in parallel to (n-1) AND gates 36. Monitor lines 26 also pass in parallel to AND gates 36. Outputs of AND gates 36 are combined with the signal T on transmit line 25 as shown to produce the signal P.

Figure 7:
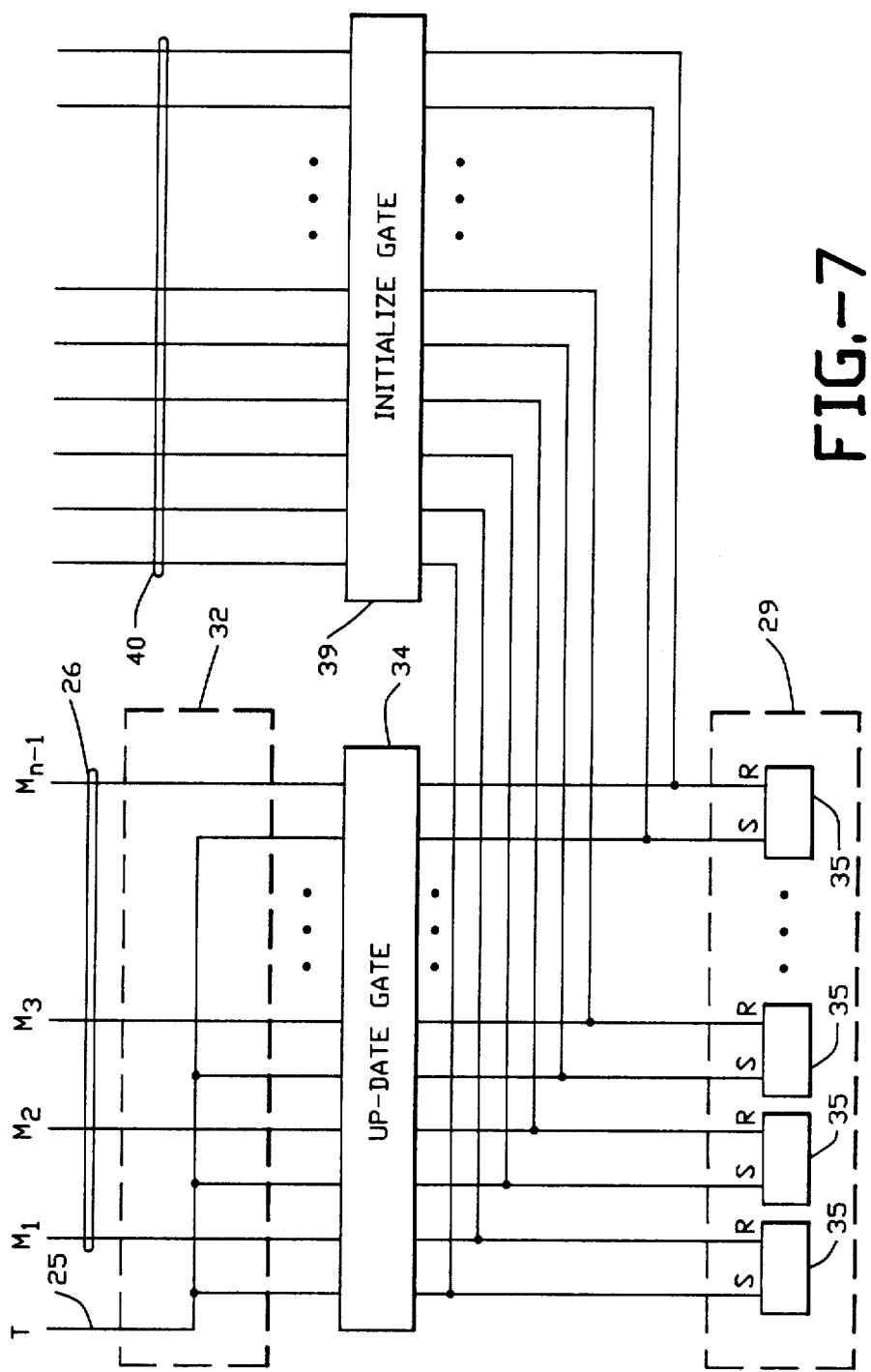
FIG. 7 shows the connections of update circuitry of the access controller of FIG. 2.

Up-date circuitry 32, as shown particularly in FIG. 7, connects transmit line 25 to the set inputs of each of two state storage elements 35 and connects the monitor lines 26 respectively to the reset inputs of each of the storage elements 35. These connections are made through update gate 34. The output lines 40 from initialize key 38 are connected through initialize gate 39 to the set and reset inputs of storage elements 35.

Control circuitry 27 includes a cycling state machine 46 which controls the operation of access controller 17 and keeps track of what is happening on the intercommunication bus. The operation of this state machine is diagramed in FIG. 6 and will be further discussed in connection with the system operation.

Access controller 18 and further access controllers are identical to access controller 17.

Turning to the operation of the system, a user typically operates quasi-independently processing instructions, using its own local cache memory and with its own synchronizing clock which is not that of the bus or other users. From time to time the computations performed will generate a requirement to exchange information with another system component. Typical events requiring information exchange are need for data stored in another user's cache memory, need to update data stored in another users memory, and need to obtain information from an i/o device in order to process an interrupt. Information is exchanged over the intercommunication bus in a transaction. There may be several types of transaction but each will have a defined format specifying what is transmitted on which bus component and in what order. In the system describe here, the format calls for signals identifying the transaction type to pass on the control bus and detailed information such as addresses and data to pass on the intercommunication bus. When a user has need to communicate over the bus system it loads output buffers with the information to service a transaction and then transmits to its access controller 17 a bus request signal R on bus request line 19 indicating that it seeks to use the intercommunication bus and is ready to initiate a transaction. When a grant signal G is received from access controller 17 on grant line 20 the user begins a bus transaction.

A user also continually monitors the buses to detect signals indicating that a transaction initiated by another user requires the monitoring user to provide a response. When it detects such a signal, it loads the response into output buffers and when these are ready it emits a response ready signal R on line 50 to its controller 17. Then when a response enable signal E is received on line 51, it begins transmission of the response.

Figure 6:
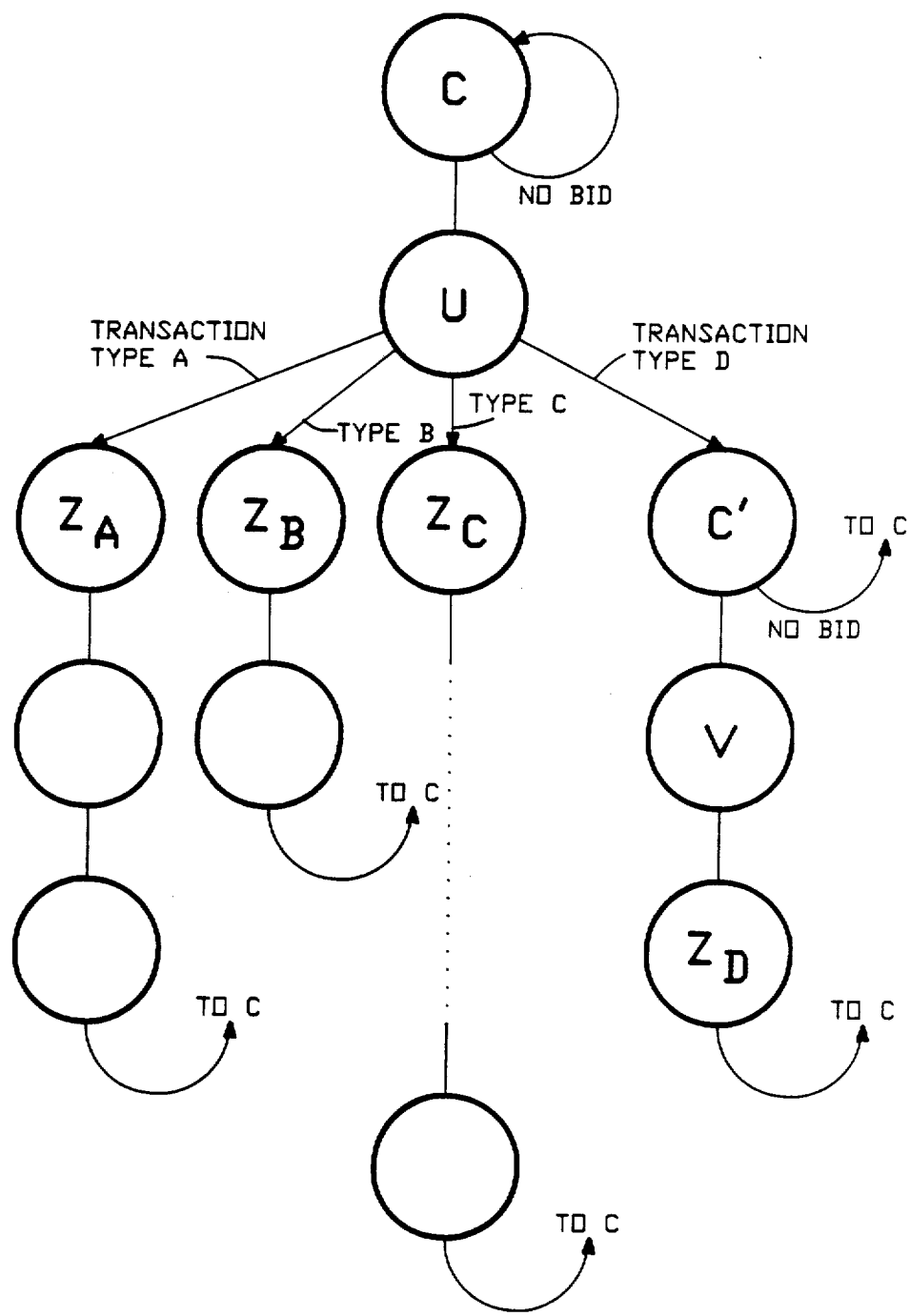
FIG. 6 shows the operations of a state machine used in the invention.

The operation of access controller 17 is organized by control circuitry 27 which can be understood with reference to its state machine diagramed in FIG. 6. This state machine passes from state to state through loops with no particular starting point. It transfers from one state to the next with the onset of each time increment marked by the A clock.

It will be convenient to follow the operation of the state machine from a point when it has just entered into the state C at the top of the diagram. The existence of the state machine in state C defines a contention interval, and during this interval control circuitry 27 emits an active C signal which, as shown in FIG. 2, is applied to drive circuitry 28, access grant circuitry 31, and no-bid circuitry 33. At the end of the time increment marked by the A clock, if control circuitry 27 has received an active no-bid signal X from no-bid circuitry 33 it reenters state C; absent the no-bid signal it shifts to state U. The C and clock signals are shown in FIG. 5.

Figure 5:
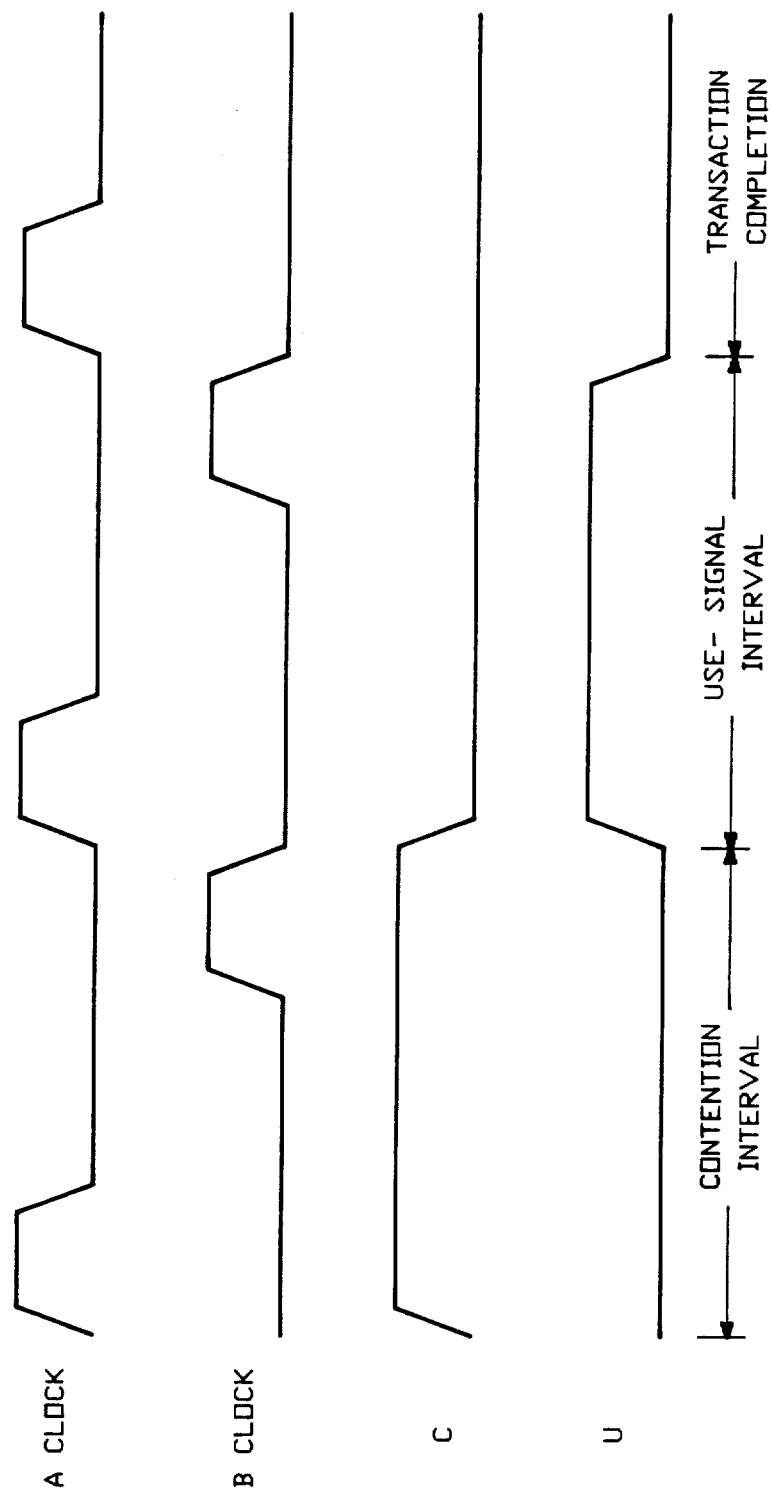
FIG. 5 shows timing signals used in the access control system of FIG. 1.

The existence of the state machine in state U defines a use-signal interval, and during this interval, control circuitry 27 emits an active U signal as shown in FIG. 5. The U signal, as shown in FIG. 2, is applied to access grant circuitry 31 and up-date gate 34. During the time increment when the state machine exists in the U state, control circuitry receives from control bus 22 signals indicating which type of transaction is being initiated by one of the users 12. In accordance with these received signals, at the end of the period the state machine branches to one of several transaction completion states, denominated Z, each corresponding to one of the predefined transaction types.

The transaction types A, B are representative of rather simple transactions such as effecting transfer of data from the initiating user to an input-output device. Longer and more complex transactions may also be defined and use as illustrated by transaction type C. For all transactions the state machine continues through a chain of successive transaction completion states as may be required to complete the particular transaction type which is in progress. When the state machine reaches the end of whatever chain it is following it reverts to state C and begins another contention interval.

The Type D branch chain is of particular relevance to the present invention. Such a transaction is exemplified by an interrupt acknowledge transaction which may occur when a processor-user wishes to service an interrupt and initiates a Type D transaction to obtain needed information. On branching according to a Type D transaction, the state machine enters state C'. The existence of the state machine in state C' defines a response bid interval, and during this interval control circuitry 27 emits an active C' signal which, as shown in FIG. 2, is applied to drive circuitry 28, access grant circuitry 31, and no-bid circuitry 33.

At the end of the time increment for existence in state C' (marked by the A clock), if control circuitry 27 has received an active no-bid signal X from no-bid circuitry 33 it reenters state C; absent the no-bid signal it shifts to state V.

The existence of the state machine in the V state defines a response enablement interval, and during this interval control circuitry 27 emits the V signal, which, as shown in FIG. 2, is applied to access grant circuitry 31.

At the end of its period in the V state the state machine returns to state C shown at the top of FIG. 6.

Control circuitry 27 also is responsive to a "wait" signal received from the control bus during any of the states to causes the state machine to reenter a state rather than progressing to the next state. This feature permits any user that is unready to keep up with the standard transaction pace to delay the advance of state machines in all controllers by transmitting the wait signal on the control bus.

It may be noted that while the operation of the state machine is contingent on signals received from the control bus, it is indifferent to which user is emitting these signals. As a result the state machines of the several access controllers are in step keeping independent but identical reports of the state of the intercommunication bus.

Consider now the interactions of the signals emitted by the control circuitry with other elements of the access controller. To facilitate this discussion the signals on the (n-1) monitor lines will be designated $M_i$ with i running 1 to (n-1). The signals of the storage elements 35 will be designated $S_i$ with the index of the storage element corresponding to that of the monitor line connected to the same one of AND gates 36.

When the C signal emitted by the control circuitry during a contention interval is applied to drive circuitry 28, it causes, if user 12 has signalled on line 19 that it seeks to use the intercommunication bus, the transmission of a bus contention signal through interconnect key 24 to the arbitration bus channel associated with the user.

Also during a contention interval any contention signals transmitted onto the arbitration bus are applied to arbitration logic 30, where they are logically analyzed with the signals out of priority state store 29 to produce the signal P indicative of whether the user 12 has a dominating priority. If an active condition on an arbitration bus channel is denominated 1 and an inactive 0, and if the two states of the storage elements $S_i$ of the priority state store are similarly denominated, the logical operation of the arbitration logic may be described in terms of modulo 2 arithmetic as $$P = T(M_1S_1+1)(M_2S_2+1)\ldots(M_{n-1}S_{n-1}+1).$$

The C signal together with the B clock applied to access grant circuitry 31 effect the capture of the P signal into grant latch 37 during the later part of the contention interval. The contention signals from the arbitration bus are also applied to and logically analyzed in the no-bid circuitry 33, the result being emitted as the X signal by the application of the C signal and the B clock. The X signal provides control circuitry 27 with the criterion for immediately restarting a contention interval.

The U signal emitted by the control circuitry during a use-signal interval is applied to access grant circuitry 31, and if the W signal out of the grant latch 37 is asserted, this causes the G signal to be sent to user 12 on line 20. The G signal in turn causes the emitting of the T signal from drive circuitry 28. The U signal together with the B clock is also applied to up-date gate 34 to effect the up-dating of the priority storage elements during the later part of the use-signal interval.

Control circuitry 27 is also responsive to an initialize signal received on the control bus to enable the transfer of signals from initialize key 38 to priority state store 29 through initialize gate 39.

When the C' signal emitted by the control circuitry during a response bid interval is applied to drive circuitry 28, it causes, if user 12 has signalled a response ready signal R' on line 50 indicating that it is ready to respond on the intercommunication bus, the transmission of a response bid signal through interconnect key 24 to the arbitration bus channel associated with the user.

Also during a response bid interval any response bid signals transmitted onto the arbitration bus are applied to arbitration logic 30, where they are logically analyzed with the signals out of priority state store 29 to produce the signal P indicative of whether the user 12 has a dominating priority, the analysis being as described in connection with the contention interval.

The V signal emitted by the control circuitry during a response enablement interval is applied to access grant circuitry 31, and if the W signal out of the grant latch 37 is at this time asserted, this causes the E signal to be sent to user 12 on line 51.

We now consider the global organization through which the several access controllers interact with each other. It should be noted that the several controllers are all identical in construction and operation. The only distinctions between one controller and another lie in the interconnect keys through which the controllers are connected to the arbitration bus, in the information content of the priority state stores, and in the initialize keys which establish initial values of the priority state stores.

Figure 4:
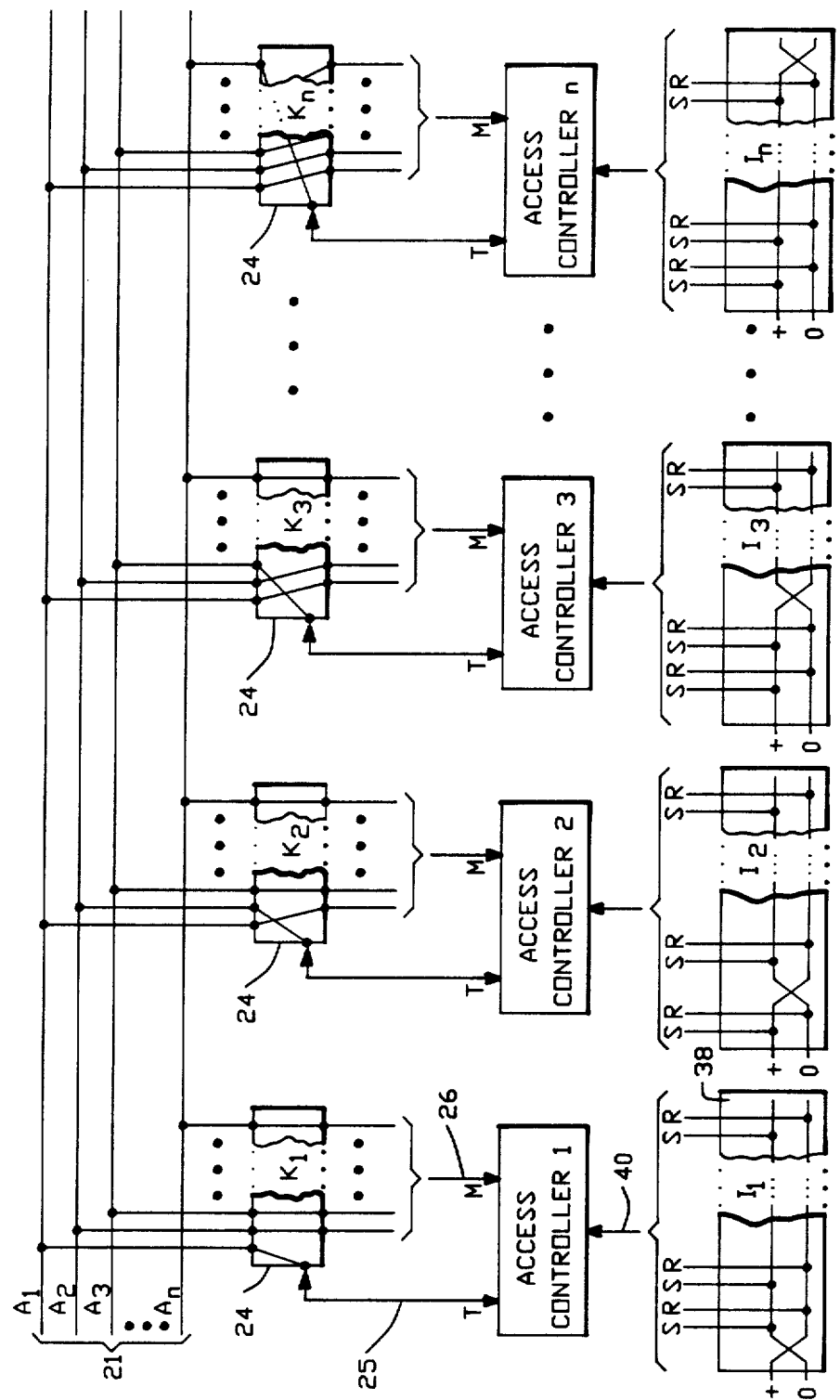
FIG. 4 shows in detail the construction of interconnect keys used in the access control system of FIG. 1.

Interconnect keys 24 interconnect arbitration bus 21 with access controllers 17 as shown particularly in FIG. 4. In contrast to the controllers 17, which are all alike, the interconnect keys and the initialize keys are distinct and organized in a pattern on a global basis. Each key on its bus side has n connections connected to the n arbitration bus channels (which will be designated $A_1$, $A_2, \ldots A_n$). Each interconnect key on its controller side connects to the transmit line 25 (signal T) and to the (n-1) monitor lines 26 (signals $M_i$) of its associated controller. A first interconnect key (designated $K_1$) has internal connections connecting $A_1$ to its transmit line and the (n-1) bus channels other than $A_1$ to the (n-1) monitor lines of its controller; a second interconnect key $K_2$ has internal connections connecting $A_2$ to the transmit line and the (n-1) bus channels other than $A_2$ to the (n-1) monitor lines of its controller; and so on through the interconnect keys. In particular, the transmit line of each controller is connected through keys $K_i$ to a distinct bus channel $A_i$. The connection scheme is illustrated in FIG. 8.

The initialize keys 38, as shown particularly in FIG. 4, generate signals from the voltage supply (0 and +) which are applied in direct or inverted order through initialize gate 39 to the set and reset inputs of storage elements 35 of priority state store 29.

In the first initialize key $I_1$, (associated with access controller 1 and interconnect key $K_1$), the connections are such as to apply the + voltage to the set inputs of none and the reset inputs of all of the storage elements, so that when the initialize gate 39 of access controller 1 admits these signals all its storage elements will be reset to 0.

In the second initialize key $I_2$, the connections are such as to apply the + voltage to the set input of the first storage element and the rest inputs of all of the higher indexed storage elements, so that when the initialize gate 39 of access controller 2 admits these signals, the first of its storage elements will be set to 1 and the higher indexed storage elements will be reset to 0. (The indexing of the storage elements is that of the associated monitor line and signal as assigned in the discussion of the interconnect keys.)

In the third initialize key $I_3$, the connections are such as to apply the + voltage to the set input of the first and second storage elements and the reset inputs of all of the higher indexed storage elements, so that when the initialize gate 39 of access controller 3 admits these signals, the first and second of its storage elements will be set to 1 and the higher indexed storage elements will be reset to 0.

The connection pattern continues to the higher indexed initialize keys, with the switching position below which the + voltage is applied to the set input increasing progressively for the higher indexed initialize keys. The $n^{th}$ initialize key has the switching position above the highest indexed storage element with the result that all its storage elements will be set. The general pattern is illustrated in the following table:

| Initialize Key | Switch position between Storage elements |
|---|---|
| 1 | −1 |
| 2 | 1−2 |
| 3 | 2−3 |
| ... | ... |
| n | n− |

For purposes of a discussion of the global aspects of the operation of the invention it will be convenient to use a different convention for identifying the signals of the storage elements of priority state store 29 than that used in discussing the internal operation of a single controller. The storage elements signals will be denominated with reference to their connections to the arbitration bus. Each storage element is associated (in different ways) with two distinct bus channels. A storage element signal will be designated $S_{ij}$, with the meaning that it is in the access controller whose T line is connected through its interconnect key to bus channel $A_i$, and is associated with channel $A_j$ by being connected to the same AND gate 36 as channel $A_j$. Since AND gates 36 are never connected to the same bus channel as T, the $S_{ij}$ are constrained by the condition i not equal to j.

The signals stored in the priority state store of each controller essentially indicate the current priority of the controller against each other controller. That is, when $S_{13}$ is 1, it indicates to controller 1 that controller 3 has a dominating priority. While any combination of values may occur in the (n-1) storage elements of a single controller, not all global combinations of values of the n (n-1) system elements are compatible with an ordered priority ranking of the controllers. The global conditions that must be met by the stores to reflect an ordered priority ranking of the controllers are that $S_{ij}$ be not equal to $S_{ji}$ and that the number of ones in any controller store be different from that in any other. The organization of the initialize keys ensures that these conditions are met at the start of operations, and the organization of the interconnect keys ensures that all updating changes maintain the required conditions.

From a system viewpoint, each controller keeps track in its priority state store of its priority status against each other controller. Then at the beginning of the contention interval each controller, if it seeks to initiate a transaction on the intercommunication bus, promulgates a bid to all others by transmission on its proper arbitration channel (that is, the one with which it is uniquely associated by connection through its interconnect key). Towards the end of the contention interval, each controller through its arbitration logic analyzes the bid signals to determine what controller is to be granted access to the intercommunication bus. In the succeeding use-signal interval the bidding controller which has been granted access enables its user to initiate a transaction on the intercommunication bus and also announces this use to all other controllers by emitting the T signal on its proper channel. Towards the end of the use-signal interval (at the time of the B clock) the signals on the arbitration bus indicating which controller has used the intercommunication bus are passed through the up-date gates and used to update the priority record. The using controller revises its record to show that every other controller now dominates it; each non-using controller records that the using controller is now subordinate to itself. The result of these revisions is to move the last using controller from its previous position to the bottom of the priority order while otherwise leaving the priority order unchanged.

The system operation thus implements a policy of making the last initiator of a transaction go to the end of the priority line.

In dealing with certain transactions requiring a response and where there may be one, several, or no qualified responders, a response bid interval occurs in which each qualified responder indicates that it is ready to respond by transmission on its proper arbitration channel of a response bid signal. These any signals placed on the arbitration bus during the response bid interval are analyzed to determine whether there is any bidding responder, and if so which one has priority. If there is no qualified responder the system without delay restarts the contention for a new transaction; if there are one or more a qualified responders one is enabled to make the response. The operation during the response bid interval follows the pattern of that during the contention interval and uses the same access controller circuitry with advantages of economy. By immediately restarting the primary contention for a new transaction when there is no bid for response, the system avoids tying up the buses waiting for a reply that will never come.

The response bidding operation does not make any revision of the priority store information and so does not interfere with the priority policy for awarding most ancient user priority in initiating a transaction. In most of the preceding discussion it has been assumed that a full complement of users was bidding for the use of the intercommunication bus—that is that there are n actively bidding users for a system with n arbitration channels. The system works equally well if there are fewer than n users or if some users are passive, participating in transactions but never initiating any. In such cases the nominal priority of the passive or non-existent users will rise to the top ranks, but since these users never bid for the intercommunication bus, the bus grant will always be to the highest ranking bidding user.

The described system facilitates interchangeability of operating users on an intercommunication bus because the controllers are identical. Thus an intercommunication bus may be designed with the unique connect and initialize keys terminating in standard ports to which a controller and user can be connected. Users with different functions can then be attached to any port indiscriminately.

What is claimed is:

1. In a computer system having a multiplicity of subunits connected to a shared bus, distributed bus arbitration apparatus comprising:

an arbitration bus with means for carrying a multiplicity of substantially simultaneous bus request signals; and a multiplicity of arbitration means, each coupled to the shared bus, the arbitration bus and a corresponding one of the subunits, for determining the relative priorities by which said subunits shall access said shared bus; each said arbitration means determining only whether said subunit coupled to said arbitration means is to be granted access to said shared bus;

each said arbitration means including:

status means for storing status signals denoting which ones of said subunits have higher priority and which ones have lower priority than the subunit corresponding to said arbitration means;

bus requesting means coupled to said arbitration bus for asserting a bus request signal on said arbitration bus; and access control means, coupled to said arbitration bus and said status means, for receiving bus request signals asserted on said arbitration bus and for granting said corresponding subunit access to said shared bus only when said bus requesting means has asserted a bus request signal and none of the received bus request signals were asserted by the arbitration means of subunits denoted by said status means as having higher priority than said corresponding subunit;

wherein said multiplicity of arbitration means simultaneously arbitrate access to the shared bus.

2. The distributed bus arbitration apparatus of claim 1, said arbitration means further including:

use asserting means coupled to said arbitration bus for asserting a use signal on said arbitration bus when said access control means grants access to the corresponding subunit; and status updating means coupled to said status means for storing a status signal denoting low priority for each subunit granted access to said shared bus;

whereby said multiplicity of arbitration means maintain distinct but consistent status signals in their respective status means.

3. The distributed bus arbitration apparatus of claim 1, said arbitration means further including:

use asserting means coupled to said arbitration bus for asserting a use signal on said arbitration bus when said access control means grants access to the corresponding subunit; and status updating means coupled to said status means for storing a status signal denoting low priority for each subunit granted access to said shared bus, and for storing high priority status signals for all other subunits when said corresponding subunit is granted access to said shared bus.

4. In a computer system having a multiplicity of subunits connected to a shared bus, distributed arbitration apparatus comprising:

an arbitration bus having a separate channel for each said subunit; and a multiplicity of arbitration means, each coupled to the shared bus, the arbitration bus and to a corresponding one of the subunits, for determining the priority by which said subunits shall access said shared bus; each said arbitration means determining only whether said subunit coupled to said arbitration means is to be granted access to said shared bus;

each said arbitration means including:
  status means for storing a multiplicity of status signals denoting which of said subunits have priority over the subunit corresponding to said arbitration means;
  bus requesting means coupled to said arbitration bus for asserting a bus request signal on the channel of said arbitration bus corresponding to said arbitration means; and
  access control means, coupled to said arbitration bus and said status means, for comparing bus request signals asserted on the channels of said arbitration bus with corresponding ones of said status signals stored in said status means, and for granting the corresponding subunit access to said shared bus only if none of said bus request signals correspond to status signals denoting subunits having higher priority than said corresponding subunit.

5. The distributed bus arbitration apparatus of claim 4, said arbitration means further including:

use asserting means coupled to said arbitration bus for asserting a use signal on the channel of said arbitration bus corresponding to said arbitration means when said access control means grants access to the corresponding subunit; and status updating means, coupled to said status means and said arbitration bus, for storing a low priority status signal for each subunit granted access to said shared bus, and for storing high priority status signals for all other subunits when said corresponding subunit is granted access to said shared bus.

6. In a computer system having a multiplicity of subunits connected to a shared bus, arbitration apparatus comprising:

an arbitration bus having a separate channel for each other said subunit; and a multiplicity of arbitration means, each coupled to the shared bus, the abitration bus and to a corresponding one of the subunits, for determining the priority by which said subunits shall access said shared bus; each said arbitration means determining only whether said subunit coupled to said arbitration means is to be granted access to said shared bus;

each said arbitration means including:
  status means for storing status signals denoting which ones of said subunits have higher priority and which ones have lower priority than the subunit corresponding to said arbitration means;
  bus requesting means coupled to said arbitration bus for asserting a bus request signal on the channel of said arbitration bus corresponding to said arbitration means; and
  access control means, coupled to said arbitration bus and said status means, for receiving bus request signals asserted on said arbitration bus and for granting the corresponding subunit access to said shared bus only when said bus requesting means has asserted a bus request signal and none of said received bus request signals correspond to subunits denoted by said status means as having higher priority than said corresponding subunit.

7. In a computer system having a multiplicity of subunits interconnected by an arbitration bus with means for carrying a multiplicity of substantially simultaneous bus request signals, a method of arbitrating access by said subunits to a shared bus, the steps of the method comprising performing, substantially simultaneously, the following steps at each subunit:

storing a distinct set of status signals denoting which ones of said subunits have higher priority and which ones have lower priority than said subunit;

asserting a bus request signal on said arbitration bus when said subunit needs access to said shared bus;

comparing said bus request signals asserted on said arbitration bus with said status signals for said subunit; and granting said subunit access to said shared bus only when said subunit has asserted a bus request signal and none of said bus request signals correspond to subunits denoted by said status signals as having higher priority than said subunit;

whereby each subunit simultaneously arbitrates access to the shared bus.

8. The bus arbitration method of claim 7, said granting step further including the step of asserting a use signal on said arbitration bus when said subunit is granted access to said shared bus; and said storing step further including the steps of storing a status signal denoting low priority for each subunit granted access to said shared bus, and resetting said status signals to a predefined state when said subunit is granted access to said shared bus;

whereby said multiplicity of subunits maintain distinct but consistent sets of status signals.

9. The bus arbitration method of claim 7, said granting step further including the step of asserting a use signal on said arbitration bus when said subunit is granted access to said shared bus; and said storing step further including the steps of storing a status signal denoting low priority for each subunit granted access to said shared bus, and storing high priority status signals for all other subunits when said corresponding subunit is granted access to said shared bus.

10. In a computer system having a multiplicity of subunits interconnected by an arbitration bus with means for carrying a multiplicity of substantially simultaneous bus request signals, a method of arbitrating access by said subunits to a shared bus, the steps of the method comprising:

storing, for each subunit, a distinct set of status signals denoting which ones of said subunits have higher priority and which ones have lower priority than said subunit;

asserting on said arbitration bus a separate bus request signal for each of those subunits which need access to said shared bus; and substantially simultaneously, at each one of said subunits which asserted a bus request signal, comparing said bus request signals asserted on said arbitration bus with said stored status signals for said subunit and granting said subunit access to said shared bus only if none of said bus request signals correspond to subunits denoted by said stored status signals as having higher priority than said subunit;

whereby each subunit simultaneously arbitrates access to the shared bus.

11. The bus arbitration method of claim 10, said granting step further including the step of asserting a use signal on said arbitration bus when said subunit is granted access to said shared bus; and said storing step further including the steps of storing a status signal denoting low priority for each subunit granted access to said shared bus, and storing high priority status signals for all other subunits when said corresponding subunit is granted access to said shared bus.

* * * * *

UNITED STATES PATENT AND TRADEMARK OFFICE
CERTIFICATE OF CORRECTION

PATENT NO. : 4,920,486
DATED : April 24, 1990
INVENTOR(S) : Michael J. K. Nielsen It is certified that error appears in the above-identified patent and that said Letters Patent is hereby corrected as shown below:

Column 9,
Line 15, after "bus" delete the semicolon, and insert, -- , and for resetting said status signals to a predefined state when said corresponding subunit is granted access to said shared bus; --

Column 10,
Line 13, after "each" delete "other"

Signed and Sealed this

Twenty-first Day of June, 2005

JON W. DUDAS
*Director of the United States Patent and Trademark Office*